United States Patent
Escamilla et al.

(10) Patent No.: US 12,216,513 B2
(45) Date of Patent: Feb. 4, 2025

(54) PROCESSOR EXPANSION MODULE SOCKET FLOATING CAM PIN

(71) Applicant: Dell Products L.P., Round Rock, TX (US)

(72) Inventors: Eduardo Escamilla, Round Rock, TX (US); Juan Gonzalez, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 220 days.

(21) Appl. No.: 18/078,394

(22) Filed: Dec. 9, 2022

(65) Prior Publication Data

US 2024/0192738 A1    Jun. 13, 2024

(51) Int. Cl.
*G06F 1/18*        (2006.01)
(52) U.S. Cl.
CPC .................................. *G06F 1/185* (2013.01)
(58) Field of Classification Search
CPC .............................................. G06F 1/182–185
USPC ......................................................... 361/760
See application file for complete search history.

(56) References Cited

U.S. PATENT DOCUMENTS

| 8,001,310 B2 | 8/2011 | Wheeler et al. |
| 9,019,699 B2* | 4/2015 | Knopf ................... G06F 1/1658 |
| | | 361/679.33 |
| 2023/0038805 A1* | 2/2023 | Geng ................... H01L 23/433 |

* cited by examiner

*Primary Examiner* — Hung S. Bui
(74) *Attorney, Agent, or Firm* — Larson Newman, LLP

(57) ABSTRACT

An information handling system includes a processing system, a side wall, and a spring. The side wall includes a mounting stud and a capture mechanism to retain a second processing system. The capture mechanism includes a mounting bracket movably affixed to the side wall. The mounting bracket includes a mounting hole and a retention stud rigidly affixed to the mounting bracket. The retention stud engages with a retaining mechanism of the second processing system to couple the second processing system to the first processing system. The spring is attached between the mounting stud and the mounting hole.

20 Claims, 2 Drawing Sheets

PROCESSOR EXPANSION MODULE SOCKET FLOATING CAM PIN

FIELD OF THE DISCLOSURE

This disclosure generally relates to information handling systems, and more particularly relates to a floating cam pin for a processor expansion module socket.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems.

SUMMARY

An information handling system may include a processing system, a side wall, and a spring. The side wall may include a mounting stud and a capture mechanism to retain a second processing system. The capture mechanism may include a mounting bracket movably affixed to the side wall. The mounting bracket may include a mounting hole and a retention stud rigidly affixed to the mounting bracket. The retention stud may engage with a retaining mechanism of the second processing system to couple the second processing system to the first processing system. The spring may be attached between the mounting stud and the mounting hole

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can certainly be used in this application. The teachings can also be used in other applications, and with several different types of architectures as needed or desired.

Figure 1:
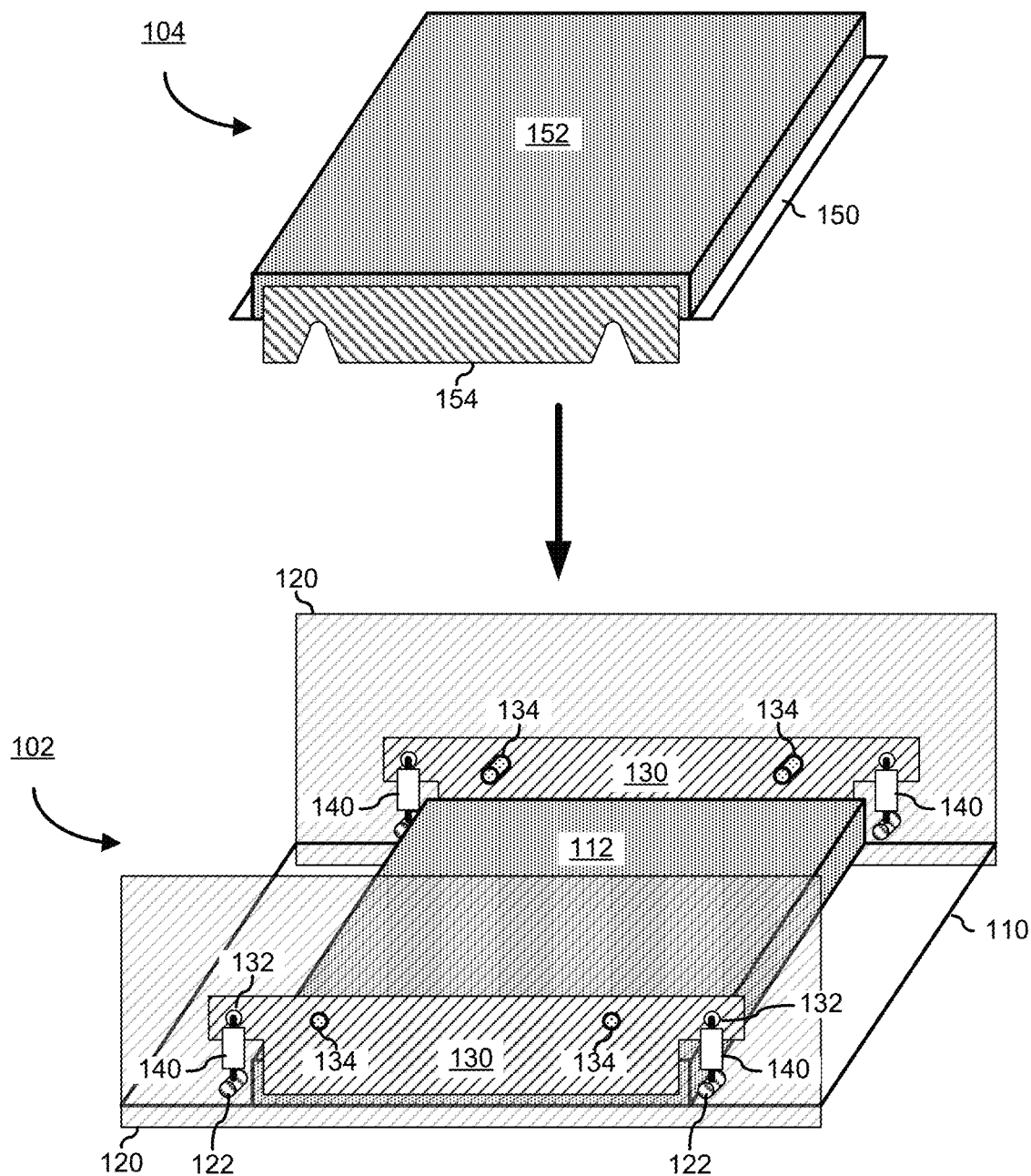
FIG. 1 is a perspective view of an information handling system according to an embodiment of the current disclosure.

FIG. 1 illustrates an information handling system 100 including a base system 102 and a processor expansion module (PEM) 104. Base system 102 represents an element of datacenter equipment that is rack-mounted and configured to be installed within a server rack, such as a 19-inch server rack. In a particular embodiment, base system 102 represent a 2U or 4U element of datacenter equipment. Information handling system 100 is configurable to operate in to topologies. In a first topology, base system 102 operates as a stand-alone information handling system without the addition of PEM 104. In this case, base system 102 will typically be configured with one (1), two (2), or four (4) processors, as described further below. In a second topology, PEM 104 is installed onto base system 102 to create an expanded capability for information handling system 100.

In particular, PEM 104 enhances to topology of information handling system 100 by providing an additional one (1), two (2), or four (4) processors, as described further below. Thus where base system 102 is configured in a 1U configuration, information handling system 100 is configured in a 2U configuration to accommodate the addition of a 1U-depth PEM 104, and where base system 102 is configured in a 2U configuration, the information handling system is configured in a 4U configuration to accommodate the addition of a 2U-depth PEM. Note that information handling system 100 may have other configurations than 2U and 4U, as needed or desired.

Base system 102 includes a base printed circuit board (PCB) 110, side walls 120, mounting brackets 130 and tensioning springs 140. Base PCB 110 represents a main board of information handling system 100, and includes processor complex 112. Processor complex 112 represents a portion of the architecture of base board 110 that includes the processors, memory devices, processor voltage regulators, input/output (I/O) interfaces, and the like that provide the processing functions normally associated with datacenter equipment. Processor complex 112 may include the one. (1), two (2), or four (4) processors or sockets for the processors, and may have heatsinks for the processors that make up the depth (i.e., 1U or 2U) of base system 102. The details of processor design, placement of processors in a server system, the associated memory, voltage regulators, I/O elements, and the like, are known in the art and will not be described further herein, except as may be needed to illustrate the current embodiments.

Side walls 120 are part of the enclosure of information handling system 100, making up the sides of the rack-mountable enclosure. Side walls 120 have a height that is equal to the particular configuration of information handling system 100 (that is, 2U or 4U). Side walls 120 each include two or more spring mounting studs 122. Spring mounting studs 122 are rigidly affixed to the associated side wall 120 and protrude inward into the enclosed space of information handling system 100. The functions and features of spring mounting studs 122 will be described further below.

Mounting brackets 130 are mounting features to which PEM 104 are attached as described further below. One mounting bracket 130 is movably affixed to an each side wall 120. In particular, each mounting bracket 130 may move vertically with respect to associated side wall 120, but are otherwise retained to the associated side wall. As such, mounting brackets 130 preferably are assembled to associated side walls 120 when the enclosure of information handling system 100 is fabricated. In a particular embodiment, mounting brackets 130 include vertical tracks, such as elongated holes and are loosely riveted to associated side walls 120, so as to permit the vertical travel of the mounting brackets with respect to the side walls. Mounting brackets 130 each include at least two (2) spring mounting holes 132 and at least two (2) PEM mounting studs 134, as described further below.

Tensioning springs 140 are connected between side walls 120 and associated mounting brackets 130. As mounting brackets 130 are moved upward with respect to associated side walls 120, tensioning springs 140 are elongated, providing a greater resistance to the upward movement the more the tensioning springs are elongated. A bottom loop of each tensioning spring 140 is attached to one of spring mounting studs 122, and a top loop of each tensioning spring is attached to one of spring mounting holes 132. Thus each mounting bracket is restrained in its upward vertical movement by two (2) tensioning springs. In a particular embodiment, when mounting bracket 130 is at a bottom of its range of movement, tensioning springs 140 provide a pre-tensioning force to the mounting bracket. In another embodiment, when mounting bracket 130 is at a bottom of its range of movement, tensioning springs 140 provide no pre-tensioning of the mounting bracket. As illustrated, each mounting bracket 130 is fitted with two tensioning springs 140. However a larger or smaller number of tensioning springs may be utilized, as needed or desired. For example, a particular mounting bracket may be fitted with one (1) tensioning spring, or more than two (2) tensioning springs. In a particular embodiment, mounting bracket 130 is fitted with four (4) tensioning springs, two (2) on each end of the mounting bracket. In a particular embodiment, tensioning springs 140 have a spring constant of around 17 Newton (N)/mm.

PEM 104 includes a PEM PCB 150, a processor complex 152, and mounting retainers 154. PEM PCB 150 represents an expansion board of information handling system 100, and includes processor complex 112. Processor complex 152 represents an expansion capability of the architecture of information handling system 100 that includes additional processors, memory devices, processor voltage regulators, input/output (I/O) interfaces, and the like that provide an expanded capacity for the processing functions normally associated with datacenter equipment. Processor complex 152 may include the one. (1), two (2), or four (4) processors or sockets for the processors, and may have heatsinks for the processors that make up the depth (that is, 1U or 2U) of PEM 104. Base PCB 110 may include one or more connector receptacles that provide power from the base PCB and that route various control signals and data interfaces, and PEM PCB 150 may include matching connectors that receive the power to operate the PEM PCB and to receive the control signals and data interfaces. In this way, the processing capacity of PEM 104 is seamlessly integrated into the topology of information handling system 100. The details of electrically connecting a PEM to a base system are known in the art and will not be further described herein, except as may be needed to illustrate the current embodiments.

Mounting retainers 154 are fixtures attached to PEM 104 that function to align the PEM with base system 102, and to capture and retain a firm mechanical hold between the PEM and the base system. As such, mounting retainers 154 are illustrated with two (2) tapered alignment slots. Mounting retainers 154 include a mechanical mechanism to capture and retain PEM 104 to base system 102. For example, mounting retainers 154 may each include two (2) individual lever-actuated latch mechanisms that engage with mounting studs to retain PEM 104 to base system 102. In another example, mounting retainers 154 may include a single cam-interlocked set of latches. PEM 104 may include additional mounting features, such as mechanical stand-offs that ensure that a proper distance is maintained between the PEM and base system 102, as needed or desired. The details of capturing and retaining a PEM to a base system are known in the art and will not be further described herein, except as may be needed to illustrate the current embodiments.

In a typical information handling system the base system, and particularly the side walls, include rigidly affixed PEM mounting studs that are aligned with the tapered alignment slots of the mounting retainers of the PEM. It has been understood by the inventors of the current disclosure that the stack-up tolerances within an information handling system are subject to minor variation. For example, the base PCB may typically be mounted to the enclosure of an information handling system with stand-offs that, while fairly precise in their vertical dimension, may have a variable tolerance in their vertical dimension. Similarly, the thickness of the PCB may have a vertical tolerance. The vertical dimension of the stand-offs between the base system and the PEM may have a tolerance. Further, the connectors between the base system and the PEM may have a vertical tolerance. Moreover, the act of assembling the connector portions to respective base PCB and PEM PCB may introduce additional variance in the stack-up height of the information handling system with the PEM installed.

It has been further understood that, when the typical information handling system includes rigidly affixed PEM mounting studs to the side walls of the enclosure, the placement of the PEM mounting studs may themselves be subject to a vertical tolerance. It was further understood that, as a result of this potential tolerance mismatch, the typical method for mounting a PEM to a base system is for the latch mechanisms of the mounting retainers to apply a retaining force that is above the minimum force needed to ensure good electrical and mechanical attachment between the PEM and the base system. In particular, the typical mounting retainer applies a large overpressure to ensure that the minimum force is applied in the case of the worst possible stack-up tolerances. This overpressure has been understood to induce unintended distortions and stresses in the connections between the PEM and the base system. In particular, the overpressure may result in mechanical deflection of the PCBs causing misalignment between the connectors, or may apply stress to the solder joints to the connectors, resulting in cracked solder and reduced reliability between the PEM and the base system.

In other cases, the stack-up of vertical tolerances may result in latching the PEM to the associated base system with insufficient force to ensure a secure mechanical and electrical contact between the PEM and the base system. Thus it would be advantageous to provide a mechanism to mechanically retain a PEM to the associated base system in a way that permits a more consistent application of the retaining force between the PEM and the base system in spite of the variable tolerance stack-ups found in the components of the information handling system.

In the current embodiments, when PEM 104 is installed to base system 102, and the latching mechanism is engaged to PEM mounting studs 134, the latching mechanism pulls mounting bracket 130 upward against the counter pressure of tensioning springs 140. Here, in the first case where the stack-up tolerances would normally lead to an overpressure condition, tensioning springs 140 absorb the overpressure condition, thereby decreasing the deformation to base PCB 110 and to the electrical connectors between base system 102 and PEM 104. Also, in the second case where the stack-up tolerances would normally lead to an underpressure condition, the pre-tensioning provided by tensioning springs 140 ensure that sufficient connection pressure is maintained.

Figure 2:
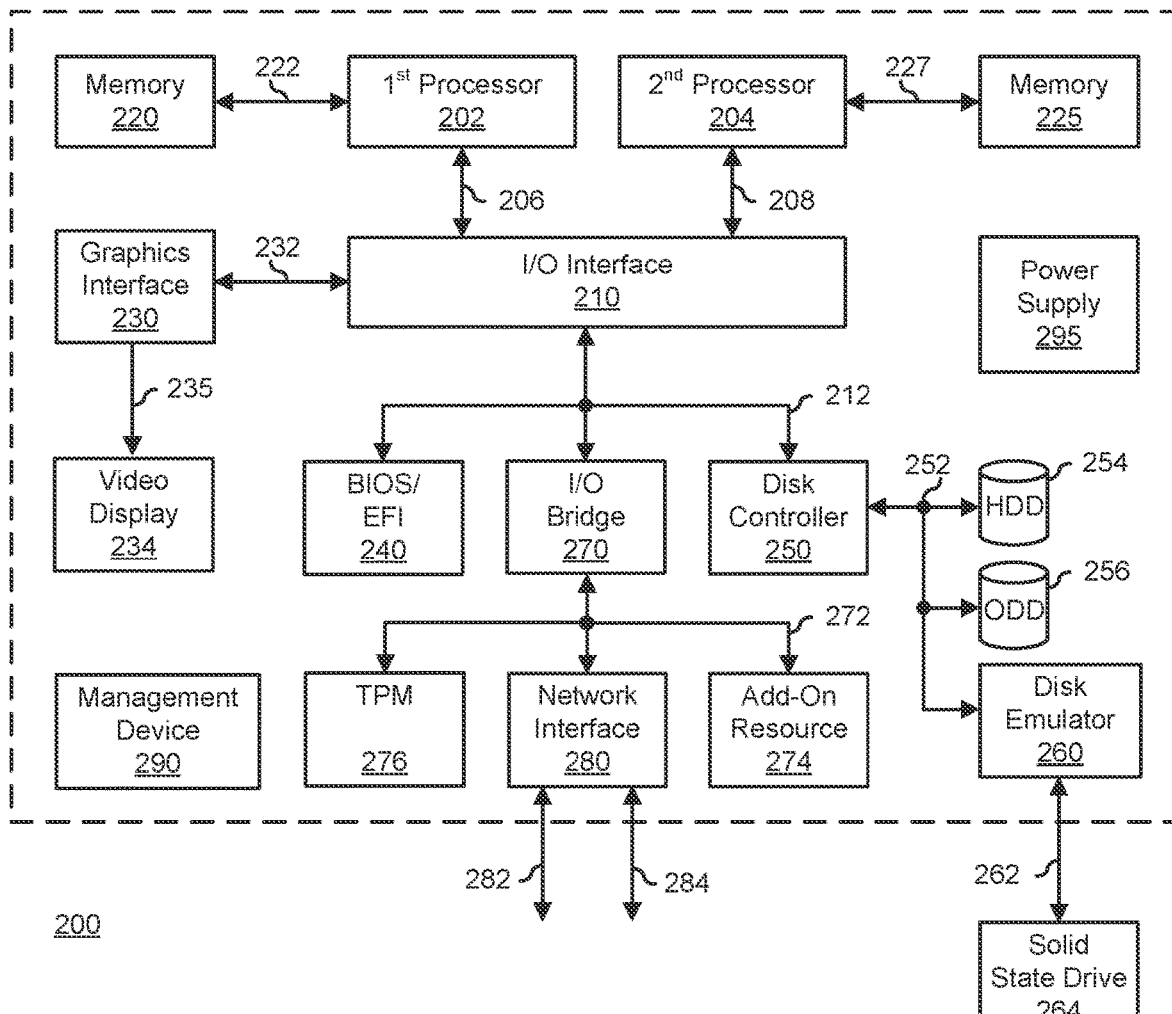
FIG. 2 is a block diagram illustrating a generalized information handling system according to another embodiment of the present disclosure.

FIG. 2 illustrates a generalized embodiment of an information handling system 200. For purpose of this disclosure an information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 200 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 200 can include processing resources for executing machine-executable code, such as a central processing unit (CPU), a programmable logic array (PLA), an embedded device such as a System-on-a-Chip (SoC), or other control logic hardware. Information handling system 200 can also include one or more computer-readable medium for storing machine-executable code, such as software or data. Additional components of information handling system 200 can include one or more storage devices that can store machine-executable code, one or more communications ports for communicating with external devices, and various input and output (I/O) devices, such as a keyboard, a mouse, and a video display. Information handling system 200 can also include one or more buses operable to transmit information between the various hardware components.

Information handling system 200 can include devices or modules that embody one or more of the devices or modules described below, and operates to perform one or more of the methods described below. Information handling system 200 includes processors 202 and 204, an input/output (I/O) interface 210, memories 220 and 225, a graphics interface 230, a basic input and output system/universal extensible firmware interface (BIOS/UEFI) module 240, a disk controller 250, a hard disk drive (HDD) 254, an optical disk drive (ODD) 256, a disk emulator 260 connected to an external solid state drive (SSD) 262, an I/O bridge 270, one or more add-on resources 274, a trusted platform module (TPM) 276, a network interface 280, a management device 290, and a power supply 295. Processors 202 and 204, I/O interface 210, memory 220 and 225, graphics interface 230, BIOS/UEFI module 240, disk controller 250, HDD 254, ODD 256, disk emulator 260, SSD 262, I/O bridge 270, add-on resources 274, TPM 276, and network interface 280 operate together to provide a host environment of information handling system 200 that operates to provide the data processing functionality of the information handling system. The host environment operates to execute machine-executable code, including platform BIOS/UEFI code, device firmware, operating system code, applications, programs, and the like, to perform the data processing tasks associated with information handling system 200.

In the host environment, processor 202 is connected to I/O interface 210 via processor interface 206, and processor 204 is connected to the I/O interface via processor interface 208. Memory 220 is connected to processor 202 via a memory interface 222. Memory 225 is connected to processor 204 via a memory interface 227. Graphics interface 230 is connected to I/O interface 210 via a graphics interface 232, and provides a video display output 235 to a video display 234. In a particular embodiment, information handling system 200 includes separate memories that are dedicated to each of processors 202 and 204 via separate memory interfaces. An example of memories 220 and 225 include random access memory (RAM) such as static RAM (SRAM), dynamic RAM (DRAM), non-volatile RAM (NV-RAM), or the like, read only memory (ROM), another type of memory, or a combination thereof.

BIOS/UEFI module 240, disk controller 250, and I/O bridge 270 are connected to I/O interface 210 via an I/O channel 212. An example of I/O channel 212 includes a Peripheral Component Interconnect (PCI) interface, a PCI-Extended (PCI-X) interface, a high-speed PCI-Express (PCIe) interface, another industry standard or proprietary communication interface, or a combination thereof. I/O interface 210 can also include one or more other I/O interfaces, including an Industry Standard Architecture (ISA) interface, a Small Computer Serial Interface (SCSI) interface, an Inter-Integrated Circuit (I2C) interface, a System Packet Interface (SPI), a Universal Serial Bus (USB), another interface, or a combination thereof. BIOS/UEFI module 240 includes BIOS/UEFI code operable to detect resources within information handling system 200, to provide drivers for the resources, initialize the resources, and access the resources. BIOS/UEFI module 240 includes code that operates to detect resources within information handling system 200, to provide drivers for the resources, to initialize the resources, and to access the resources.

Disk controller 250 includes a disk interface 252 that connects the disk controller to HDD 254, to ODD 256, and to disk emulator 260. An example of disk interface 252 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 260 permits SSD 264 to be connected to information handling system 200 via an external interface 262. An example of external interface 262 includes a USB interface, an IEEE 1394 (Firewire) interface, a proprietary interface, or a combination thereof. Alternatively, solid-state drive 264 can be disposed within information handling system 200.

I/O bridge 270 includes a peripheral interface 272 that connects the I/O bridge to add-on resource 274, to TPM 276, and to network interface 280. Peripheral interface 272 can be the same type of interface as I/O channel 212, or can be a different type of interface. As such, I/O bridge 270 extends the capacity of I/O channel 212 when peripheral interface 272 and the I/O channel are of the same type, and the I/O bridge translates information from a format suitable to the I/O channel to a format suitable to the peripheral channel 272 when they are of a different type. Add-on resource 274 can include a data storage system, an additional graphics interface, a network interface card (NIC), a sound/video processing card, another add-on resource, or a combination thereof. Add-on resource 274 can be on a main circuit board, on a separate circuit board or add-in card disposed within information handling system 200, a device that is external to the information handling system, or a combination thereof.

Network interface 280 represents a NIC disposed within information handling system 200, on a main circuit board of the information handling system, integrated onto another component such as I/O interface 210, in another suitable location, or a combination thereof. Network interface device 280 includes network channels 282 and 284 that provide interfaces to devices that are external to information handling system 200. In a particular embodiment, network channels 282 and 284 are of a different type than peripheral channel 272 and network interface 280 translates information from a format suitable to the peripheral channel to a format suitable to external devices. An example of network channels 282 and 284 includes InfiniBand channels, Fibre Channel channels, Gigabit Ethernet channels, proprietary channel architectures, or a combination thereof. Network channels 282 and 284 can be connected to external network resources (not illustrated). The network resource can include another information handling system, a data storage system, another network, a grid management system, another suitable resource, or a combination thereof.

Management device 290 represents one or more processing devices, such as a dedicated baseboard management controller (BMC) System-on-a-Chip (SoC) device, one or more associated memory devices, one or more network interface devices, a complex programmable logic device (CPLD), and the like, that operate together to provide the management environment for information handling system 200. In particular, management device 290 is connected to various components of the host environment via various internal communication interfaces, such as a Low Pin Count (LPC) interface, an Inter-Integrated-Circuit (I2C) interface, a PCIe interface, or the like, to provide an out-of-band (OOB) mechanism to retrieve information related to the operation of the host environment, to provide BIOS/UEFI or system firmware updates, to manage non-processing components of information handling system 200, such as system cooling fans and power supplies. Management device 290 can include a network connection to an external management system, and the management device can communicate with the management system to report status information for information handling system 200, to receive BIOS/UEFI or system firmware updates, or to perform other task for managing and controlling the operation of information handling system 200. Management device 290 can operate off of a separate power plane from the components of the host environment so that the management device receives power to manage information handling system 200 when the information handling system is otherwise shut down. An example of management device 290 includes a commercially available BMC product or other device that operates in accordance with an Intelligent Platform Management Initiative (IPMI) specification, a Web Services Management (WS-Man) interface, a Redfish Application Programming Interface (API), another Distributed Management Task Force (DMTF), or other management standard, and can include an Integrated Dell Remote Access Controller (iDRAC), an Embedded Controller (EC), or the like. Management device 290 may further include associated memory devices, logic devices, security devices, or the like, as needed or desired.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims.

In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An information handling system, comprising:
   a first processing system;
   a first side wall including a first mounting stud and a first capture mechanism to retain a second processing system, the first capture mechanism including a first mounting bracket movably affixed to the first side wall, the first mounting bracket including a first mounting hole and a first retention stud rigidly affixed to the first mounting bracket, the first retention stud to engage with a retaining mechanism of the second processing system to couple the second processing system to the first processing system; and
   a first spring attached between the first mounting stud and the first mounting hole.

2. The information handling system of claim 1, wherein the first side wall further includes a second mounting stud, and wherein the first mounting bracket further includes a second mounting hole and a second retention stud.

3. The information handling system of claim 2, further comprising a second spring attached between the second mounting stud and the second mounting hole.

4. The information handling system of claim 1, wherein the first mounting bracket further includes a third retention stud rigidly affixed to the first mounting bracket, the third retention stud to further engage with the retaining mechanism.

5. The information handling system of claim 1, further comprising:
   a second side wall including a third mounting stud and a second capture mechanism to further retain the second processing system, the second capture mechanism including a second mounting bracket movably affixed to the second side wall, the second mounting bracket including a third mounting hole and a fourth retention stud rigidly affixed to the second mounting bracket, the fourth retention stud to further engage with the retaining mechanism; and
   a third spring attached between the third mounting stud and the third mounting hole.

6. The information handling system of claim 5, wherein the second side wall further includes a fourth mounting stud, and wherein the second mounting bracket further includes a fourth mounting hole and a fifth retention stud.

7. The information handling system of claim 6, further comprising a fourth spring attached between the fourth mounting stud and the fourth mounting hole.

8. The information handling system of claim 5, wherein the second mounting bracket further includes a sixth retention stud rigidly affixed to the second mounting bracket, the sixth retention stud to further engage with the retaining mechanism.

9. The information handling system of claim 1, wherein the second processing system is a processor expansion module.

10. The information handling system of claim 1, wherein the first processing system and the first side wall are included in a rack mountable enclosure.

11. A method, comprising:
fixing a first processing system in an enclosure;
fixing a first mounting stud to a first side wall of the enclosure; and
fixing a first capture mechanism to the first side wall, the first capture mechanism to retain a second processing system to the first processing system, wherein fixing the first capture mechanism further comprises:
movably fixing a first mounting bracket to the first side wall, the first mounting bracket including a first mounting hole and a first retention stud rigidly affixed to the first mounting bracket, the first retention stud to engage with a retaining mechanism of the second processing system; and
attaching a first spring between the first mounting stud and the first mounting hole.

12. The method of claim 11, further comprising:
fixing a second mounting stud to the first side wall; and
fixing a second retention stud to the first mounting bracket, wherein the first mounting bracket further includes a second mounting hole.

13. The method of claim 12, further comprising attaching a second spring between the second mounting stud and the second mounting hole.

14. The method of claim 11, further comprising fixing a third retention stud to the first mounting bracket, the third retention stud to further engage with the retaining mechanism.

15. The method of claim 11, further comprising:
fixing a third mounting stud to a second side wall of the enclosure; and
fixing a second capture mechanism to the second side wall, the second capture mechanism to further retain the second processing system, wherein fixing the second capture mechanism further comprises:
movably fixing a second mounting bracket to the second side wall, the second mounting bracket including a third mounting hole and a fourth retention stud rigidly affixed to the second mounting bracket, the fourth retention stud to further engage with the retaining mechanism; and
attaching a third spring between the third mounting stud and the third mounting hole.

16. The method of claim 15, further comprising:
fixing a fourth mounting stud to the second side wall; and
fixing a fifth retention stud to the second mounting bracket, wherein the second mounting bracket further includes a fourth mounting hole.

17. The method of claim 16, further comprising attaching a fourth spring between the fourth mounting stud and the fourth mounting hole.

18. The method of claim 11, further comprising fixing a sixth retention stud to the second mounting bracket, the sixth retention stud to further engage with the retaining mechanism.

19. The method of claim 11, wherein the second processing system is a processor expansion module.

20. An information handling system, comprising:
a processing system;
a processor expansion module including a retention mechanism;
a side wall including a mounting stud and a capture mechanism to retain the processor expansion module, the capture mechanism including a mounting bracket movably affixed to the first wall, the mounting bracket including a mounting hole and a retention stud rigidly affixed to the mounting bracket, the retention stud to engage with a retaining mechanism to couple the PEM to the processing system; and
a spring attached between the mounting stud and the mounting hole.

* * * * *